United States Patent

Hsu

[11] Patent Number: 6,159,582
[45] Date of Patent: Dec. 12, 2000

[54] DECORATIVE PATTERNS FOR USE ON VENETIAN BLIND AND WALL PAPER

[75] Inventor: P. S. Hsu, Changhua Hsien, Taiwan

[73] Assignee: Cheng Feng Blinds Ind. Co., LTD, Changhua Hsien, Taiwan

[21] Appl. No.: 09/356,318

[22] Filed: Jul. 16, 1999

[51] Int. Cl.[7] ........................................ B32B 9/00
[52] U.S. Cl. ................ 428/195; 428/156; 428/166; 428/187; 428/211; 428/212; 428/326; 428/411.1; 428/542.2; 428/904.4
[58] Field of Search ..................... 428/156, 187, 428/212, 166, 195, 211, 411.1, 542.2, 904.4, 402, 326

[56] References Cited

U.S. PATENT DOCUMENTS

| | | | |
|---|---|---|---|
| 4,207,366 | 6/1980 | Tyler | 428/73 |
| 4,272,580 | 6/1981 | De Zepeda-Bermudez | 428/153 |
| 4,495,012 | 1/1985 | Berenger | 156/78 |
| 5,263,529 | 11/1993 | Landis | 160/236 |
| 5,354,596 | 10/1994 | Chew et al. | 428/152 |
| 5,962,123 | 10/1999 | Mehta et al. | 428/326 |
| 6,033,512 | 3/2000 | Coco et al. | 156/230 |

FOREIGN PATENT DOCUMENTS

29912971 U1  10/1999  Germany.

Primary Examiner—Deborah Jones
Assistant Examiner—Abraham Bahta
Attorney, Agent, or Firm—Bacon & Thomas

[57] ABSTRACT

Decorative patterns for use on Venetian blind and wall paper, including a paper substrate layer, a stripe sandwiched layer and a paper face layer. A paper pulp is first laid into the paper substrate layer with a certain thickness. Then dry flowers or decorative papers are evenly sprayed over the paper substrate layer to form the stripe sandwiched layer which has high and low levels. Then a thinner paper pulp is laid over the stripe sandwiched layer to form the paper face layer. The paper face layer only covers the lower portions of the dry flowers or decorative papers of the stripe sandwiched layer so as to clamp the dry flowers or decorative papers. After dried, planed and pressed, a flexible cover article with solid structure and natural versatile solid pictures on one face is achieved.

2 Claims, 4 Drawing Sheets

DECORATIVE PATTERNS FOR USE ON VENETIAN BLIND AND WALL PAPER

BACKGROUND OF THE INVENTION

The present invention relates to decorative patterns for use on Venetian blind and wall paper. A wet paper pulp is first laid to form a paper substrate layer. Then dry flowers or decorative papers are evenly sprayed over the paper substrate layer to form a stripe sandwiched layer with high and low levels. Then a thinner paper pulp is laid over the lower portions of the dry flowers or decorative papers of the stripe sandwiched layer. After dried, planed and pressed, a flexible cover article with solid structure and natural versatile solid pictures on one face is achieved for application to blind slat, folding curtain, rolling curtain or wall paper.

In conventional blind, rolling curtain or wall paper, the stripes are printed on the paper-made wall paper or folding curtain by way of common printing or printed on the plastic-made wall paper or blind slat by way of thermal transfer-printing. Such stripes are plane figures which are unnatural and monotonous without solid feeling. Moreover, the manufacturing procedure is complicated so that the blind slat or wall paper can be hardly mass-produced. Also, such manufacturing procedure may lead to-pollution of air and water source.

SUMMARY OF THE INVENTION

It is therefore a primary object of the present invention to provide decorative patterns for use on Venetian blind and wall paper. Dry flowers or decorative papers are evenly sprayed over a paper substrate layer formed by wet paper pulp with a certain thickness. The dry flowers or decorative papers form a stripe sandwiched layer with high and low levels. Then a thinner wet paper pulp is laid over the lower portions of the dry flowers or decorative papers of the stripe sandwiched layer to achieve a flexible cover article with solid structure and natural versatile solid pictures on one face.

It is a further object of the present invention to provide the above decorative patterns in which dry flowers or decorative papers are directly laid over the paper substrate layer to form the stripe sandwiched layer and then the paper face layer is laid over the lower portions of the stripe sandwiched layer. After dried, planed and pressed, a flexible cover article with solid structure is achieved. Therefore, the manufacturing procedure is simplified and mass-production is possible to enhance the competitive ability.

It is still a further object of the present invention to provide the above decorative patterns in which the paper substrate layer and paper face layer are made of paper pulp and the natural dry flowers or decorative papers are directly laid between the paper substrate layer and face paper layer to create solid and live stripes. Therefore, the cover article will not lead to pollution of the environment and can be recovered for re-used.

The present invention can be best understood through the following description and accompanying drawings wherein:

DETAILED DESCRIPTION OF THE PREFERRED EMBODIMENT

Figure 1:
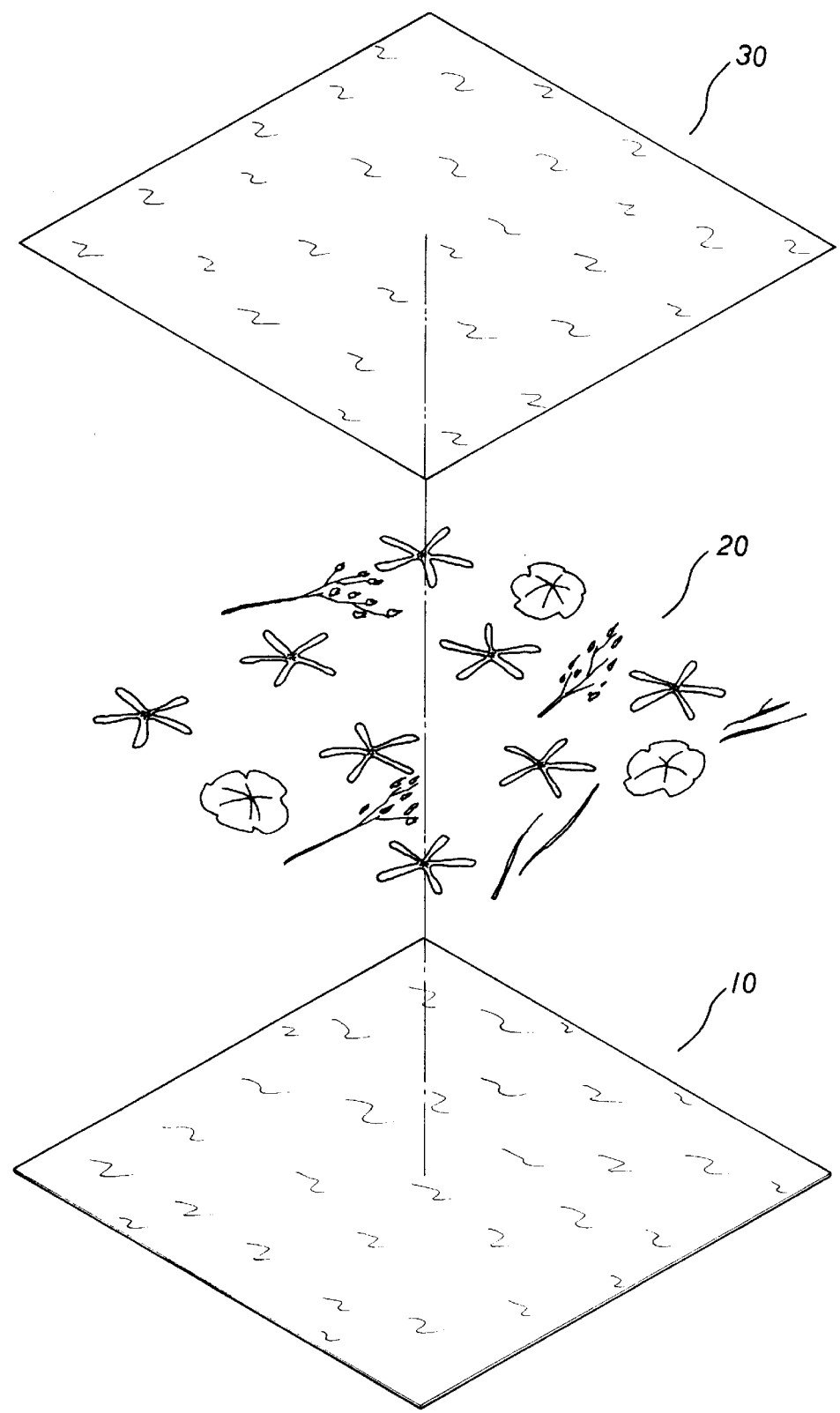
FIG. 1 is a perspective exploded view of the present invention.
Figure 2:
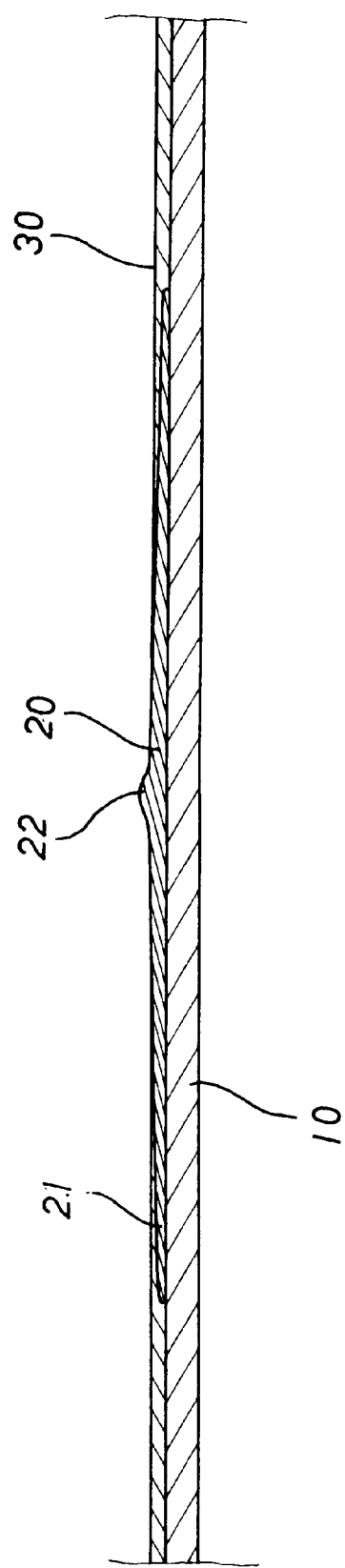
FIG. 2 is a sectional assembled view of the present invention.

Please refer to FIG. 1. The present invention includes a paper substrate layer 10, a stripe sandwiched layer 20 and a paper face layer 30. A wet paper pulp is laid into the paper substrate layer 10 with a certain thickness and length. Then dry flowers or decorative papers are evenly sprayed over the paper substrate layer 10 to form the stripe sandwiched layer 20 which has high and low levels as shown in FIG. 2. Then a thinner wet paper pulp is laid over the stripe sandwiched layer 20 to form the paper face layer 30 with a certain length. The paper face layer 30 only covers the lower portions 21 of the dry flowers or decorative papers of the stripe sandwiched layer 20 so as to clamp the dry flowers or decorative papers. The higher portions 22 of the dry flowers and decorative papers are exposed out of the surface of the paper face layer 30. Finally, the laminate is dried, planed and pressed to form a flexible cover article with solid structure and natural versatile solid pictures on one face.

Figure 3:
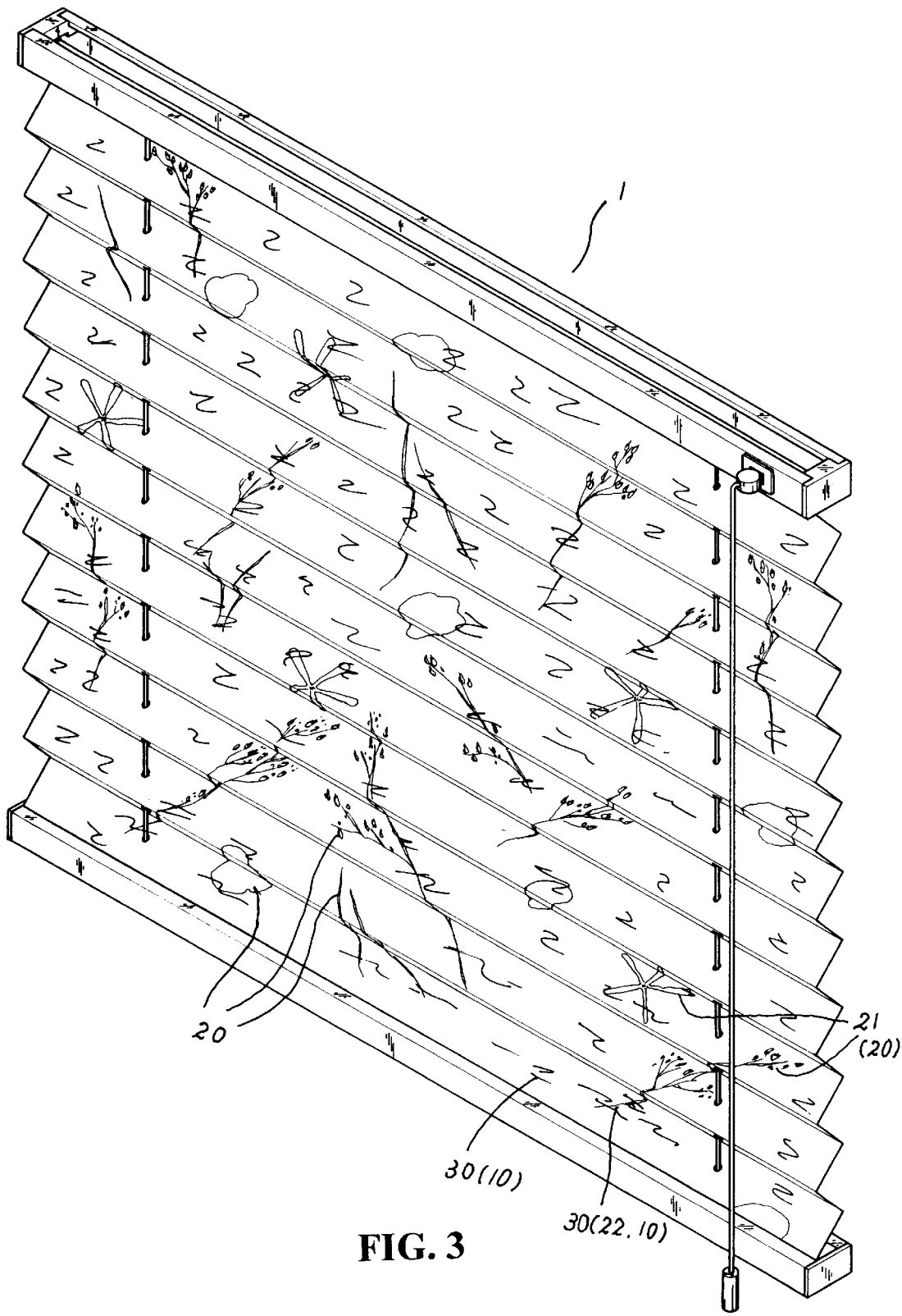
FIG. 3 shows the application of the present invention to a folding curtain.
Figure 4:
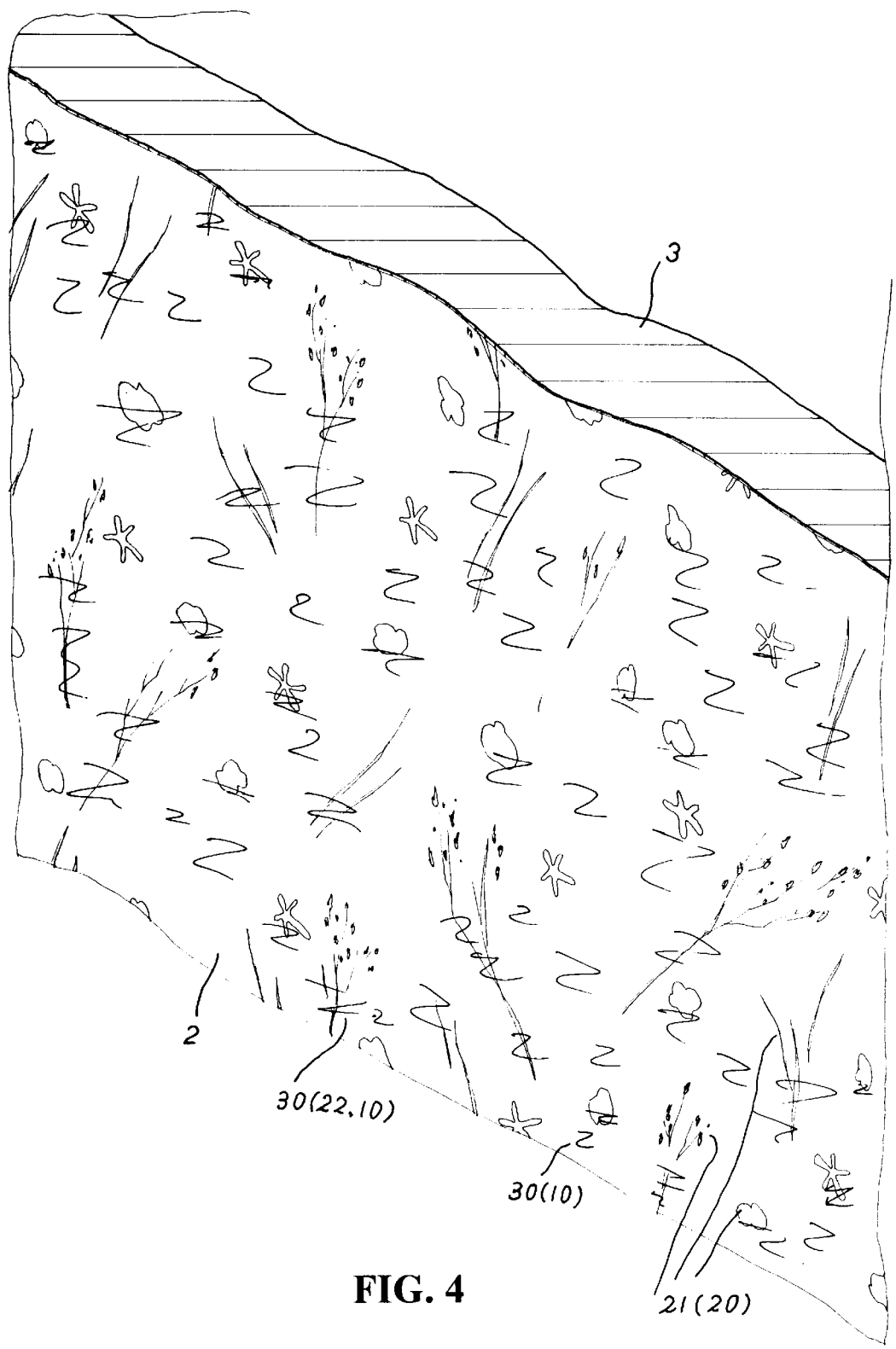
FIG. 4 shows that the present invention is used as a wall paper.

FIGS. 3 and 4 show the application of the present invention to a rolling curtain and wall paper. The flexible cover article can be cut into a suitable size and profile as necessary and applied to the blind slats, folding curtain 1 or rolling curtain or used as a wall paper to attach to a wall 3.

According to the above arrangement, the present invention has the following advantages: 1. The dry flowers or decorative papers are laid over the paper substrate layer 10 to form the stripe sandwiched layer 20 which has high and low levels. Then the paper face layer 30 is laid over the lower portions 22 of the stripe sandwiched layer 20 to clamp the dry flowers or decorative papers of the stripe sandwiched layer 20 so as to achieve natural, versatile and solid pictures on the surface of the cover article; 2. The dry flowers or decorative papers are directly laid over the paper substrate layer 10 to form the stripe sandwiched layer 20 and then the paper face layer 30 is laid over the lower portions 22 of the stripe sandwiched layer 20. Therefore, the manufacturing procedure is simplified and mass-production is possible to enhance the competitive ability; and 3. The natural dry flowers or decorative papers are directly laid between the paper substrate layer 10 and face paper layer 30 to create solid and live stripes. Therefore, the cover article will not lead to pollution of the environment and can be recovered for re-used.

The above embodiment is only used to illustrate the present invention, not intended to limit the scope thereof. Many modifications of the above embodiment can be made without departing from the spirit of the present invention.

What is claimed is:

1. Decorative patterns for use on Venetian blind and wall paper, comprising a paper substrate layer, a stripe sandwiched layer and a paper face layer, wherein a wet paper pulp is laid into the paper substrate layer; dry flowers or decorative papers are directly evenly sprayed over the paper substrate layer to form the stripe sandwiched layer which has high and low levels; and a wet paper pulp is laid over the stripe sandwiched layer to form the paper face layer; the paper face layer only covering the lower portions of the dry flowers or decorative papers of the stripe sandwiched layer so as to clamp the dry flowers or decorative papers.

2. Decorative patterns for use on Venetian blind and wall paper as claimed in claim 1, wherein the stripe sandwiched layer is formed of dry flowers and decorative papers.

* * * * *